(12) United States Patent
Bendiabdallah et al.

(10) Patent No.: US 11,463,872 B2
(45) Date of Patent: Oct. 4, 2022

(54) SINGULARISATION OF FRAMES TO BE TRANSMITTED BY A CONNECTED OBJECT AND BLOCKING OF FRAMES RETRANSMITTED OVER A LOW-POWER WIRELESS COMMUNICATION NETWORK

(71) Applicant: ORANGE, Issy-les-Moulineaux (FR)

(72) Inventors: Halim Bendiabdallah, Chatillon (FR); Isabelle Soumoy, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 482 days.

(21) Appl. No.: 16/612,157

(22) PCT Filed: May 3, 2018

(86) PCT No.: PCT/FR2018/051098
§ 371 (c)(1),
(2) Date: Nov. 8, 2019

(87) PCT Pub. No.: WO2018/206880
PCT Pub. Date: Nov. 15, 2018

(65) Prior Publication Data
US 2021/0136102 A1    May 6, 2021

(30) Foreign Application Priority Data
May 11, 2017 (FR) ..................... 1754145

(51) Int. Cl.
*H04L 29/06* (2006.01)
*H04L 29/08* (2006.01)
(Continued)

(52) U.S. Cl.
CPC ....... *H04W 12/041* (2021.01); *H04L 63/1458* (2013.01); *H04W 12/03* (2021.01);
(Continued)

(58) Field of Classification Search
CPC ............. H04W 12/041; H04W 12/106; H04W 12/037; H04W 12/03; H04W 12/42; H04W 48/02; H04L 63/1458
(Continued)

(56) References Cited

U.S. PATENT DOCUMENTS 9,680,520 B2 * 6/2017 Gollakota ................ H04B 1/40
9,973,367 B2 * 5/2018 Gollakota ................ H04K 3/25
(Continued)

FOREIGN PATENT DOCUMENTS

| WO | 2004051956 A2 | 6/2004 | |
| WO | WO-2004051956 A2 * | 6/2004 | ........... H04L 1/1803 |
| WO | 2009007612 A1 | 1/2009 | |

OTHER PUBLICATIONS

English translation of the Written Opinion of the International Searching Authority dated Jul. 12, 2018 for corresponding International Application No. PCT/FR2018/051098, filed May 3, 2018.
(Continued)

*Primary Examiner* — Haresh N Patel
(74) *Attorney, Agent, or Firm* — David D. Brush; Westman, Champlin & Koehler, P.A.

(57) ABSTRACT

A method for singularizing frames to be transmitted by an object connected to a server via a low-power wireless communication network. The singularization method includes an integration, in a frame to be transmitted identifying the transmitting connected object and including payload data, of at least: a counter that can be incremented as a function of the frame to be transmitted, the counter having a predefined dimension; and a supplementary index that can be modified upon a zeroing of the counter. Thus, two frames originating from one and the same object with the same payload data will be unique because they will include at least one counter and at least one supplementary index that are distinct. The use of the supplementary index makes it
(Continued)

possible, without reducing the lifetime of the connected object, to singularize a greater number of frames.

6 Claims, 7 Drawing Sheets

(51) Int. Cl.
*H04W 12/041* (2021.01)
*H04W 12/03* (2021.01)
*H04W 12/42* (2021.01)
*H04W 12/106* (2021.01)
*H04W 12/037* (2021.01)
*H04L 9/40* (2022.01)
*H04W 48/02* (2009.01)
*H04W 12/122* (2021.01)
*H04W 84/04* (2009.01)

(52) U.S. Cl.
CPC ....... *H04W 12/037* (2021.01); *H04W 12/106* (2021.01); *H04W 12/42* (2021.01); *H04W 48/02* (2013.01); *H04W 12/122* (2021.01); *H04W 84/04* (2013.01)

(58) Field of Classification Search
USPC .......................................................... 726/23
See application file for complete search history.

(56) References Cited

U.S. PATENT DOCUMENTS

| | | | |
|---|---|---|---|
| 10,079,616 B2* | 9/2018 | Reynolds | H04B 1/10 |
| 10,951,446 B2* | 3/2021 | Kellogg | H04L 27/26 |
| 2015/0172031 A1* | 6/2015 | Yeo | H04W 74/04 370/329 |
| 2016/0242070 A1* | 8/2016 | Asterjadhi | H04W 74/085 |
| 2016/0323348 A1* | 11/2016 | Bradbury | H04L 65/612 |
| 2018/0192373 A1* | 7/2018 | Fang | H04L 27/06 |
| 2018/0302899 A1* | 10/2018 | Aijaz | H04L 1/1621 |
| 2018/0302908 A1* | 10/2018 | Aijaz | H04L 45/28 |
| 2018/0302911 A1* | 10/2018 | Aijaz | H04L 12/1854 |

OTHER PUBLICATIONS

International Search Report dated Jul. 4, 2018 for corresponding International Application No. PCT/FR2018/051098, filed May 3, 2018.
Written Opinion of the International Searching Authority dated Jul. 4, 2018 for corresponding International Application No. PCT/FR2018/051098, filed May 3, 2018.
Dragomir Dan et al., "A Survey on Secure Communication Protocols for IoT Systems", 2016 International Workshop on Secure Internet of Things (SIOT), IEEE, Sep. 26, 2016 (Sep. 26, 2016), pp. 47-62, XP033089808.

* cited by examiner

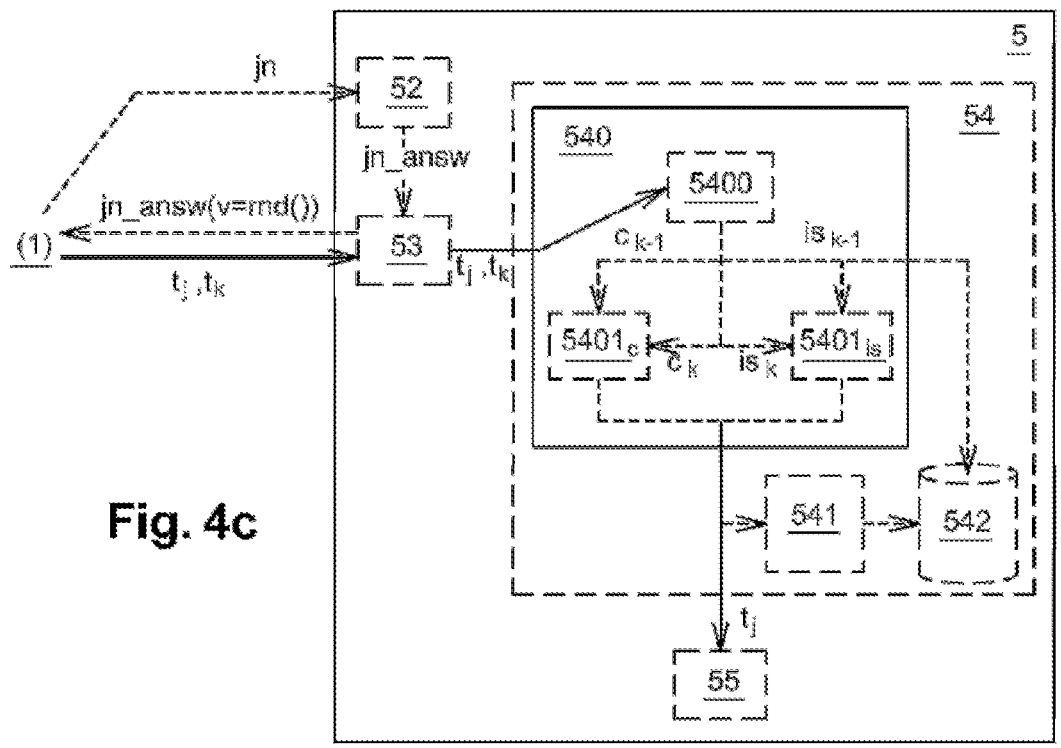
Fig. 4c
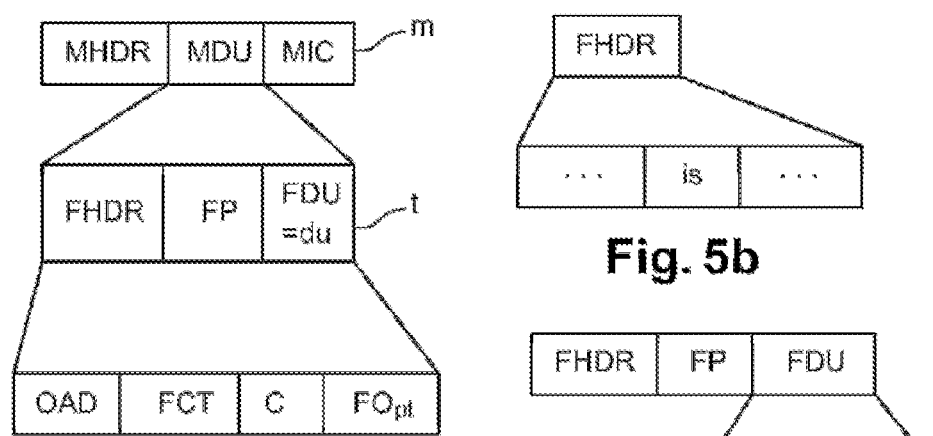
Fig. 5a
Fig. 5b
Fig. 5c
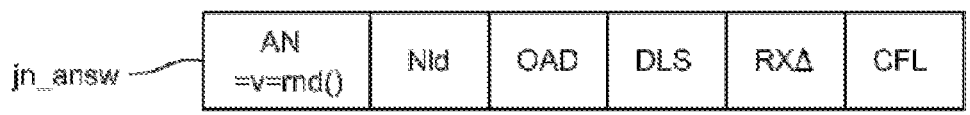
Fig. 5d

SINGULARISATION OF FRAMES TO BE TRANSMITTED BY A CONNECTED OBJECT AND BLOCKING OF FRAMES RETRANSMITTED OVER A LOW-POWER WIRELESS COMMUNICATION NETWORK

CROSS-REFERENCE TO RELATED APPLICATIONS

This Application is a Section 371 National Stage Application of International Application No. PCT/FR2018/051098, filed May 3, 2018, the content of which is incorporated herein by reference in its entirety, and published as WO 2018/206880 on Nov. 15, 2018, not in English.

FIELD OF THE DISCLOSURE

The invention relates to the singularization of frames to be transmitted by a connected object and the blocking of the frames retransmitted over a low-power wireless communication network. In particular, the invention is applied to the low-power wireless communication network in which the connected objects use the LoRa (registered trademark) technology, that is to say, a wide-area network (or Long Range).

BACKGROUND OF THE DISCLOSURE

The field of connected objects is rapidly expanding. Our daily lives are surrounded by multiple connected objects: our homes (home automation: thermostat, opening, etc., monitoring: weather station, detector, etc.), our person (watch, scales, etc.), our environment, etc. The operators of telecommunication networks offer a communication network dedicated to these connected objects: a wireless communication network that is low power by virtue of the limited capacities of the connected objects. The existing low-power wireless communication networks on offer include the SigFox (registered trademark), LoRaWan (registered trademark) and other such networks via which information is received from connected objects to be then conveyed through the internet network. For that, antennas capable of demodulating the signal from the wireless network, in particular the LoRa radio signal, into a signal conforming to a protocol of the internet network, such as the TCP/IP protocol, are installed. These antennas are coupled to what is called a Gateway, which decodes the frames received via the low-power wireless communication network to send them to what is called a Network Server, according to an Internet protocol such as TCP or UDP. The network server is capable of determining, even verifying, from among the received frames those originating from connected objects associated with the network server. Thus, the network server will not process the frames transmitted by connected objects which are not associated with it. That makes it possible to reduce the processing load of the network server. Nevertheless, the network server can still be overloaded by frames transmitted by connected objects which are associated with it: notably, by retransmission of transmitted frames. The retransmission of the frames transmitted by a connected object associated with a network server will overload not only the network server but will also possibly falsify the processing performed by the network server on the payload data originating from the associated connected objects. The data processed by the network server will thus be corrupted. The risks can be significant depending on the type of connected objects for which the data are corrupted. For example, the corruption of reading data from an electricity meter may result in an overbilling or an underbilling of one or more clients, the corruption of health data may lead to at least a medical consultation overload, and at worst the application of an inappropriate treatment, etc.

SUMMARY

One of the aims of the present invention is to remedy the drawbacks with respect to the state of the art. One subject of the invention is a method for singularizing frames to be transmitted by an object connected to a server via a low-power wireless communication network, the singularization method comprises an integration, in a frame to be transmitted identifying the transmitting connected object and comprising payload data, of at least:

a counter that can be incremented as a function of the frame to be transmitted, the counter having a predefined dimension; and a supplementary index that can be modified upon a zeroing of the counter.

Thus, two frames from one and the same object with the same payload data will be unique because they will include at least a counter and/or a supplementary index that are distinct. The use of the supplementary index makes it possible, without reducing the life of the connected object, to singularize a greater number of frames than by using only the counter generally integrated in the frames transmitted by the connected objects currently allowing the network server to check to see if a frame has not been lost. Indeed, this counter is generally coded on a small number of bytes: 2 bytes, i.e. 16 bits, for the LoRa standard generating a rapid return to zero of the counter (complete cycle in 65536 transmitted frames, i.e. approximately in six months, for an object transmitting a frame every five minutes). Thus, if a singularization solution were based only on this counter alone, that would lead to a life of the connected object aligned on a cycle of the counter, i.e. six months in our example.

Advantageously, the first value of the supplementary index in the first frame to be transmitted by the object after the connection of the object with a server is a value from among the following:

a value resulting from a random function;

a value resulting from a random function received by the object from the server in response to a connection request from the object to the server.

a value of a parameter of generation of at least one encryption key for the payload data to be transmitted resulting from a random function and received by the object from the server.

Thus, a malicious user retransmitting frames and detecting the supplementary index will have difficulty in determining and reproducing the function of the supplementary index. If the random function is implemented by the server in response to a connection request from the object to the server, the connected object does not have to implement an excessively computation-intensive operation. If the first value of the index corresponds to that of a parameter of generation of an encryption key, the transmission of the random value serving as supplementary index does not overload the exchanges of the server with the connected object.

Advantageously, the supplementary index results from a monotonic function. Thus, the detection of frame retransmission on the server side will be facilitated by a simple comparison of the value of the supplementary index of the received frame with that of the preceding frame as a function of the order of the monotonic function.

Advantageously, the singularization method comprises a modification of the supplementary index triggered by a zeroing of the counter: the value of the supplementary index is equal to a value taken randomly between a preceding value of the supplementary index and the limit value of the supplementary index. Thus, a malicious user retransmitting frames and detecting the supplementary index will have difficulties in determining and reproducing the modification of the supplementary index.

Advantageously, the singularization method triggers a new connection request from the connected object to the server when the supplementary index reaches the limit value. Thus, even if the cycle of use of the supplementary index complemented by the cycle of the counter at each value of the supplementary index is terminated, the singularization of the frames will not put an end to the life of the connected object but only to the current connection. Indeed, by triggering a new connection between the connected object and the server, at least one new key will be generated for this new connection and the server, even if it does not detect the retransmission, will not process the frames because it will be capable of determining that the retransmitted frames do not originate from the new connection (since they originate from the old connection which is no longer valid).

A subject of the invention is also a method for generating unique frames to be transmitted by a connected object to a server via a low-power wireless communication network, the generation method comprises:
  a distribution of the payload data in frames to be transmitted identifying the transmitting connected object, and
  an integration in a frame to be transmitted of at least:
    a counter that can be incremented as a function of the frame to be transmitted, the counter having a predefined dimension; and
    a supplementary index that can be modified upon a zeroing of the counter.

Thus, two frames originating from one and the same object with the same payload data will be unique because they will comprise at least a counter and/or a supplementary index that are distinct. The use of the supplementary index makes it possible, without reducing the life of the connected object, to singularize a greater number of frames that by using only the counter generally integrated in the frames transmitted by the connected objects currently allowing the network server to check whether a frame has not been lost.

Advantageously, the counter is integrated in a frame header. Thus, the counter does not require supplementary data to be added into the frame to be transmitted by using the counter already existing in the frame header and used also to check whether the frames have been lost in the transmission. The counter will therefore be used for two distinct functions on the server side: checking for loss of frame, checking for frame repetition.

Advantageously, the supplementary index is integrated in one of the following elements of the frame:
  a frame header;
  a payload part of a frame comprising the payload data.

Thus, if the supplementary index is integrated in the header, for example in the MAC address of the frame, it can be read by all the servers including those which are not associated with the transmitting connected object. That will allow a server to determine a level of risk of repetition even if it is not associated with the object. And, if the supplementary index is in the payload part of the frame, it will be more difficult for a malicious user retransmitting frames to find, in the payload part, the supplementary index and therefore modify it, thus making the singularization of the frames generated more robust.

Advantageously, the method for generating unique frames to be transmitted comprises an encryption of a payload part of the frame comprising the payload data. Thus, the supplementary index will be encrypted with the payload part when the transmission standard, such as LoRa, provides for same, further increasing the robustness of the singularization of the frames.

A subject of the invention is also a method for blocking retransmitted frames received by a communication device connected to at least one connected object from an object connected via a low-power wireless communication network, the method for blocking retransmitted frames comprises a detection of the retransmitted frames from among the frames received by the communication device from a connected object identified in the frame received via the low-power wireless communication network by comparison of the counter and of the supplementary index of a received frame with, respectively, the counter and the supplementary index of a preceding received frame from the same connected object. Thus, two frames from one and the same object with the same payload data will be unique because they will comprise at least a counter and/or a supplementary index that are distinct. The use of the supplementary index makes it possible, without reducing the life of the connected object, to singularize a greater number of frames than by using only the counter generally integrated in the frames transmitted by the connected objects currently allowing the network server to check whether a frame has not been lost.

Advantageously, the detection of retransmitted frames is positive when:
  the counter of the received frame is less than or equal to the counter of the preceding received frame and when the supplementary index is equal to or has a value relative to the supplementary index of the preceding frame corresponding to a function that is the inverse of the monotonic function used to singularize the frames to be transmitted;
  the counter of the received frame is greater than the counter of the preceding received frame and when the supplementary index has a value relative to the supplementary index of the preceding frame corresponding to a function that is the inverse of the monotonic function used to singularize the frames to be transmitted.

Thus, the blocking of a received frame is performed on simple comparison of the counter and of the supplementary index of the received frame with the preceding frame originating from the same transmitting object.

Advantageously, at the end of the detection, when a retransmission has not been detected, the counter of the received frame and, when the supplementary index differs from that of the frame previously received according to a monotonic function of the same order as that used to singularize the frames to be transmitted, the supplementary index are stored in the communication device. Thus, the comparison with the preceding frame is facilitated by storage of the counter and of the supplementary index to be compared. The gateway or the server implementing the blocking method do not have to retain all of the preceding frame, thus reducing the necessary storage capacity.

A subject of the invention is even a method for processing frames received by a communication device connected to at least one connected object from a low-power wireless communication network, the method for processing the received frames comprises a detection of the retransmitted frames from among the frames received by the communication device from a connected object identified in the received frame via the low-power wireless communication network by comparison of the counter and of the supplementary index of a received frame with, respectively, the counter and the supplementary index of a preceding received frame from the same connected object, the detection transmitting to the analysis of the method for processing of the received frames the frames for which a retransmission has not been detected. Thus, there is no overload, nor is there corruption of the processing since the latter does not process the frames repeated or retransmitted.

Advantageously, according to an implementation of the invention, the different steps of the method according to the invention are implemented by a software or a computer program, this software comprising software instructions intended to be executed by a data processor of a communication device and being designed to control the execution of the different steps of this method. The invention therefore also targets a program comprising program code instructions for the execution of the steps of the method for singularizing frames to be transmitted or of the method for generating unique frames to be transmitted or of the method for blocking retransmitted frames or of the method for processing received frames when said program is executed by a processor. This program can use any programming language and be in the form of source code, object code or intermediate code between source code and object code as in a partially compiled form or in any other desirable form.

One subject of the invention is a generator of unique frames to be transmitted by an object connected to a server via a low-power wireless communication network, the generator comprises:
  a distributor of the payload data in frames to be transmitted identifying the transmitting connected object, and
  an integrator into a frame to be transmitted of at least:
    a counter that can be incremented as a function of the frame to be transmitted, the counter having a predefined dimension; and
    a supplementary index that can be modified upon a zeroing of the counter.

A subject of the invention is an object connected to a server via a low-power wireless communication network, the connected object comprising a generator of unique frames to be transmitted, the generator comprises:
  a distributor of the payload data in frames to be transmitted identifying the transmitting connected object, and
  an integrator into a frame to be transmitted of at least:
    a counter that can be incremented as a function of the frame to be transmitted, the counter having a predefined dimension; and
    a supplementary index that can be modified upon a zeroing of the counter.

A subject of the invention is also a retransmitted frames block filter of a server receiving frames from an object connected via a low-power wireless communication network, the retransmitted frames of block filter comprises a detector of the retransmitted frames from among the frames received by the server from a connected object identified in the frame received via the low-power wireless communication network by comparison of the counter and of the supplementary index of a received frame with, respectively, the counter and the supplementary index of a preceding received frame from the same connected object.

A subject of the invention is even a gateway of a low-power wireless communication network receiving frames from a connected object intended for a server connected to an Internet network, the server comprising an analyzer of the payload data of the received frames, the gateway comprising a retransmitted frames block filter, the filter being placed upstream of the analyzer and comprising a detector of the retransmitted frames from among the frames received by the gateway from a connected object identified in the frame received via the low-power wireless communication network by comparison of the counter and of the supplementary index of a received frame with, respectively, the counter and the supplementary index of a preceding received frame from the same connected object.

A subject of the invention is a server receiving frames from an object connected via a low-power wireless communication network, the server comprising an analyzer of the payload data of the received frames and a retransmitted frames block filter, the filter being placed upstream of the analyzer and comprising a detector of the retransmitted frames from among the frames received by the server from a connected object identified in the frame received via the low-power wireless communication network by comparison of the counter and of the supplementary index of a received frame with, respectively, the counter and the supplementary index of a preceding received frame from the same connected object.

DETAILED DESCRIPTION OF ILLUSTRATIVE EMBODIMENTS

Figure 1A:
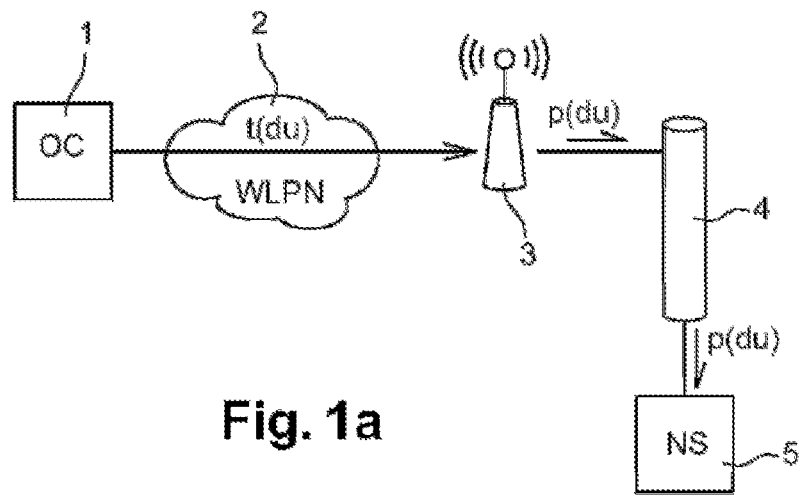
FIGS. 1a and 1b, simplified diagrams of a communication architecture in which a connected object is linked to a network server via a low-power wireless communication network, respectively in a standard communication case and in the case where a third-party device retransmits frames of communications previously transmitted by the connected object, FIG. 2, a simplified diagram of a method for singularizing frames to be transmitted and a method for generating unique frames to be transmitted according to the invention, FIG. 3, a simplified diagram of a method for blocking the retransmitted frames and a method for processing received frames according to the invention, FIGS. 4a, 4b and 4c, simplified diagrams of the communication devices implemented in a communication architecture using a low-power wireless communication network, respectively, FIG. 4a, a generator of unique frames to be transmitted and a connected object, FIG. 4b, a retransmitted frames block filter, a gateway and a server, and FIG. 4c, a retransmitted frames block filter and a server, according to the invention, FIGS. 5a to 5d, simplified diagrams of frames and requests exchanged by an object connected to a low-power wireless communication network, respectively, FIG. 5a, a frame to be transmitted according to the LoRa standard, FIG. 5b, a first example of integration of the supplementary index in the unique frame to be transmitted according to the invention, FIG. 5c, a second example of integration of the supplementary index in the unique frame to be transmitted according to the invention, FIG. 5d, a response to a connection request according to the LoRa standard, FIG. 6, a simplified diagram of a flow diagram of a method for singularizing frames to be transmitted according to the invention, FIG. 7, a simplified diagram of a flow diagram of a method for blocking retransmitted frames according to the invention.
Figure 1B:
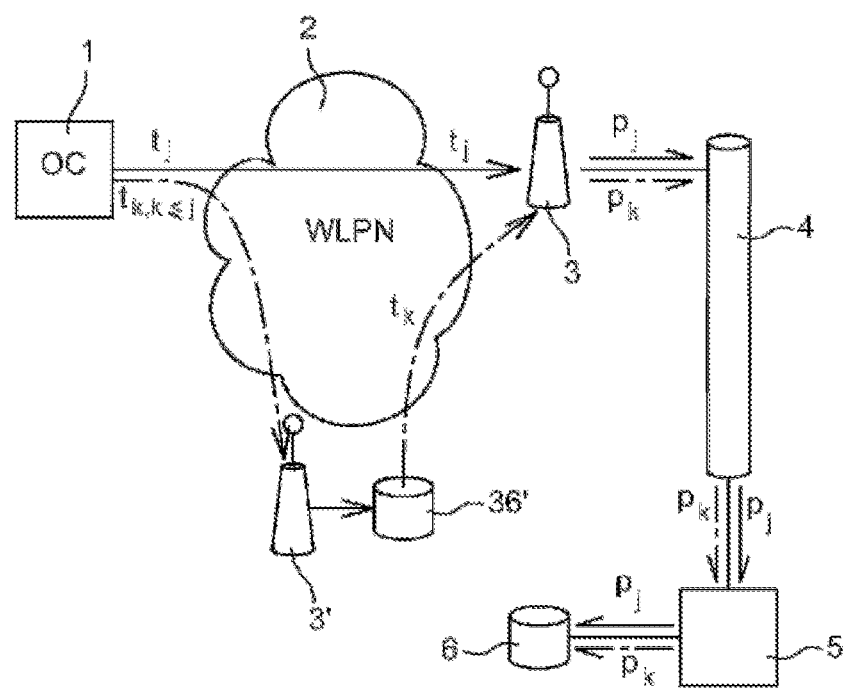

FIGS. 1a and 1b illustrate simplified diagrams of a communication architecture in which a connected object is linked to a network server via a low-power wireless communication network, respectively in a standard communication case, and in the case in which a third-party device retransmits frames of communications previously transmitted by the connected object.

The communication architecture of FIG. 1a comprises a connected object 1, notably a communication device using the LoRa technology, also called LoRa Device. A connected object OC is a device connected to the Internet notably via a low-power wireless communication network 2. The communication architecture then comprises, for example, a gateway 3 receiving the frames t transmitted by one or more connected objects 1 via the low-power wireless communication network WLPN (the frames t(du) comprising payload data du), and transmitting the frames t(du) via an Internet network, 4, notably, in packet form p(du) to a network server 5. The gateway 3 is notably capable of receiving so-called LoRa frames, that is to say frames transmitted by a communication device using the LoRa technology, the gateway is then called Gateway LoRa. The Internet network 4 is notably a network implementing the TCP/IP protocol. When the technology used by the connected object OC is LoRa, the network server NS validates the received frame, that it to say that it checks whether the received frame is transmitted by a connected object 1 associated with the network server 5. If that is the case, then the network server 5 proceeds with the processing of the received frame: analysis and/or storage, etc. Otherwise, the received frame is rejected by the network server 5, that is to say that it acts as if it had not received it because it was of no interest to it. Some standards of transmission over a low-consumption wireless communication network, notably the LoRaWan standard, define mechanisms for securing transmitted frames. Notably, they are encrypted, in the example of the LoRaWan standard, in AES. The integrity of the data transmitted in these frames is therefore assured, but not the non-repeatability of the frames. Indeed, by sniffing a frame, the frame can be retransmitted over the low-power wireless network. And, the retransmitted frame is once again taken into account by the network server.

FIG. 1b shows that a third-party communication device 3' placed in the low-power wireless communication network 2 and behaving as a gateway can capture a frame t(du) transmitted by a connected object 1. This third-party communication device is also called sniffer, in particular LoRa Sniffer in the case where the transmitted frames use the LoRa technology. In order to prevent the data transmitted by the frame being read by an unauthorized third party, some technologies of transmission over a low-power wireless communication network 2 encrypt the payload data du before integrating them into the transmission frame t. Thus, the sniffer 3' can simply receive the transmitted frames and/or store them for example in a database 36' and possibly retransmit them in the low-power wireless communication network in order for them to be received by the gateway 3. For example, a connected object 1 sends a frame $t_k$. This frame $t_k$ is received by the gateway 3 at an instant k via the low-power wireless communication network 2, then transmitted in packet form pk via the Internet network 4 to the server 5, which, the frame $t_k$ having been validated, processes it (notably stores it in a network database 6) (not illustrated). In parallel, this same frame $t_k$ is notably captured by a sniffer 3' which stores it notably in a database of the sniffer 36'. Subsequently (k<j), although the connected object 1 sends a frame $t_j$, the frame tj is received by the gateway 3 at an instant j via the low-power wireless communication network 2, then transmitted in packet form pj via the Internet network 4 to the server 5 which, the frame tj having been validated, processes it (notably stores it in a network database 6). At any moment, the sniffer 3' can retransmit a frame tk previously received and possibly stored in its database 36' via the low-power wireless communication network 2. Thus, the frame tk will be received by the gateway 3 at least a second time (even more), i.e. a little after the reception of the frame $t_k$ originating directly from the connected object 1, i.e. at the instant j, etc. Possibly, the sniffer 3' can intercept the frame $t_j$ to replace it with the frame $t_k$ previously stored. The gateway 3 will process the frame $t_k$ retransmitted by the sniffer 3' like any received frame by transmitting it to the server 5 via the Internet network 4, for example in packet form pk. And, likewise, the network server 5 will process the retransmitted frame $t_k$ by, the frame $t_k$ having been validated, processing it (notably storing it in a network database 6). Indeed, the frames transmitted via the low-power wireless communication networks do not make it possible to distinguish a frame received directly from a connected object 1 by the gateway 3 from a retransmitted frame because, in order to be adapted to this type of low-power network, the weight of the transmitted frames is reduced. Notably, the frames transmitted by the connected object 1 are not time stamped which would have easily made it possible to distinguish a directly received frame from a retransmitted frame that is not suited to the low-power network because of the weight of the time stamping. The proposed invention allows the gateway 3 or the server 5 to detect a retransmitted frame and avoid the repeatability. It notably makes it possible to avoid having the server 5 acknowledge and/or store an item of information (payload data) of a frame already transmitted. Even if the payload data are protected by an encryption and can neither be read nor modified, the retransmission of frames can compromise the integrity of the data transmitted by a connected object. Indeed, if a telemetry frame is retransmitted, the processing of the telemetry data will be disrupted since the same datum will be stored twice in the database, thus falsifying the subsequent analyses: calculation of consumption, control based on these data, etc.

Figure 2:
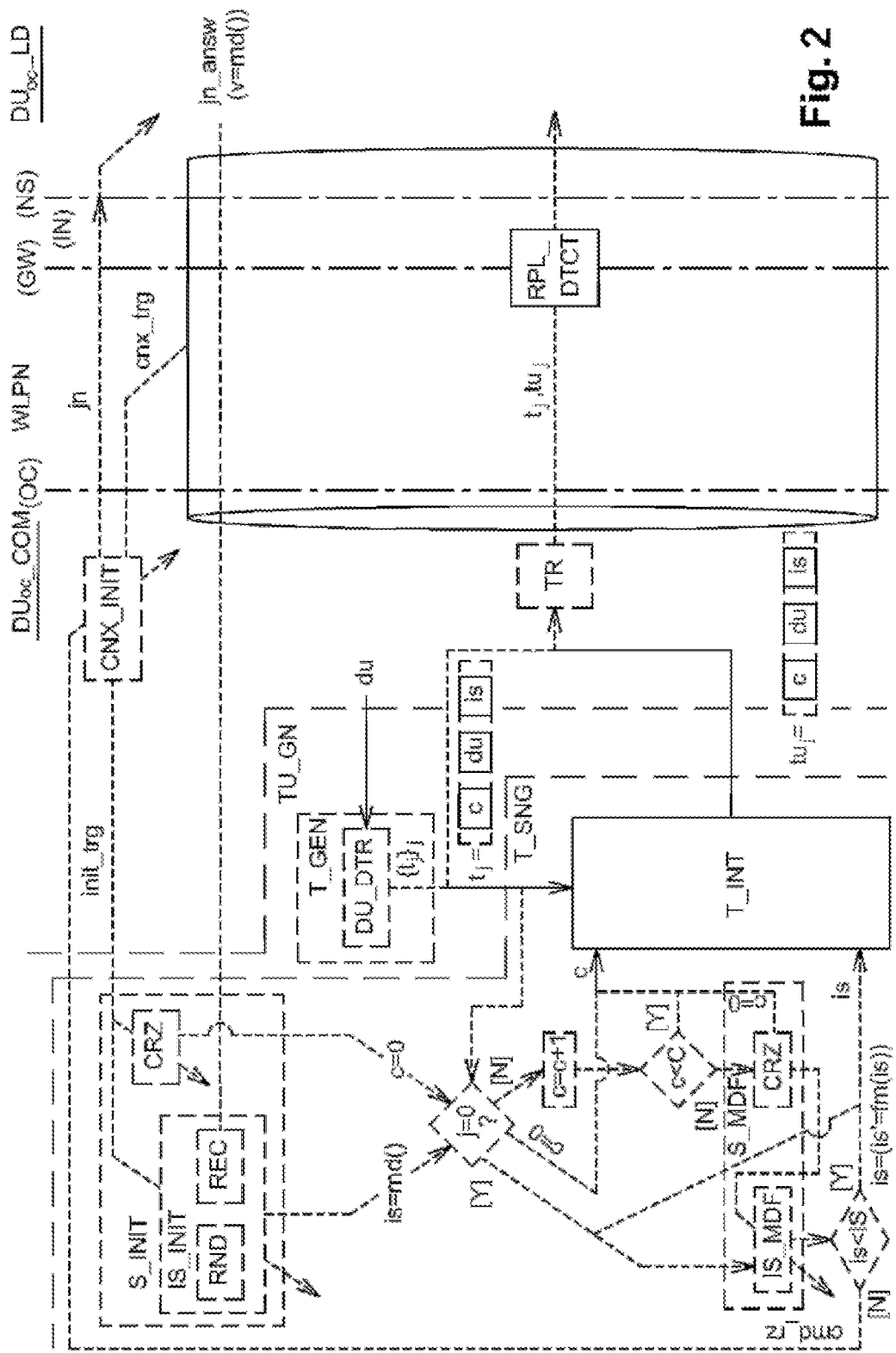

FIG. 2 illustrates a simplified diagram of a method for singularizing frames to be transmitted and of a method for generating unique frames to be transmitted according to the invention. The invention can be implemented on the connected object side notably by means of a method for singularizing frames to be transmitted T_SNG by a connected object OC to a server NS via a low-power wireless communication network WLPN. The singularization method T_SNG comprises an integration T_INT, in a frame to be transmitted $t_j$ identifying the transmitting connected object $id_{OC}$ and comprising payload data du, of at least:
  a counter c that can be incremented as a function of the frame to be transmitted, the counter having a predefined dimension (c<C); and
  a supplementary index is that can be modified upon a zeroing of the counter CRZ.

The use of a supplementary index is makes it possible to reduce the weight of the counter c in the frame while not reducing the life of the connected object. Notably, the supplementary index makes it possible to use the counters provided by the technologies for transmitting frames in low-power wireless communication networks, such as the LoRa counter which makes it possible to determine the frame losses during transmission. These counters are generally very light: for example 2 bytes for the LoRa technology. Indeed, if only the existing counters were diverted from their primary use to detect the retransmission of a frame, that would considerably reduce the life of the connected object. For example, for a counter determining loss of frames coded on 2 bytes, i.e. 16 bits, only 65536 frames with one distinct counter can be transmitted. If the transmission period of the connected object is 5 minutes, then the counter will have performed a complete cycle in scarcely 6 months. Therefore, a blocking of the frames based on just this counter would reduce the life of the object to only 6 months! One solution could be to take out a new subscription for the object connected to the service, such as a new OTAA (JoinRequest) subscription defined by the LoRaWan standard but this solution is complex and heavy in terms of network load since it requires the implementation of the exchanges necessary for this new subscription. Furthermore, since these counters are simply provided to detect the frame loss, they are easily reset to zero when the connected object is powered down because it is not stored permanently. Thus, the application of a frame blocking based on just this counter would render the connected object obsolete any time it is powered down. The advantage of not having just one counter intended to detect the retransmission of frames, possibly in addition to a counter for detecting frame loss, is to limit the weight needed in the frame for this detection of retransmission which is not insignificant in the case of transmission over a low-power wireless communication network. Furthermore, the use of the supplementary index makes it possible to use a possibly non-permanent counter on the connected object.

In particular, the first value of the supplementary index in the first frame to be transmitted by the object $tu_1(is_1=rnd(\ ))$ after the connection of the object OC with a server NS is a value resulting from a random function $is=rnd(\ )$.

In particular, the first value of the supplementary index in the first frame to be transmitted by the object $tu_1(is_1=v=rnd(\ ))$ after the connection of the object OC with a server NS is a value resulting from a random function received by the object from the server NS in response to a connection request from the object to the server $jn\_answ(v=rnd(\ ))$.

In particular, the first value of the supplementary index in the first frame to be transmitted by the object $tu_1$ $(is_1=AN=rnd(\ ))$ after connection of the object OC with a server NS is a value of a parameter AN of generation of at least one encryption key for the payload data to be transmitted resulting from a random function and received by the object from the server NS $jn\_answ(AN=rnd(\ ))$.

In particular, the supplementary index is results from a monotonic function $is=(is'=f_m(is))$, for example, an increasing function.

In particular, the singularization method T_SNG comprises a modification of the supplementary index IS_MDF triggered by a zeroing of the counter CRZ: the value of the supplementary index is equal to a value taken randomly between a preceding value of the supplementary index and the limit value of the supplementary index $is=(is'=rnd[is, IS])$.

In particular, the singularization method T_SNF triggers cnx_rz a new connection request jn from the connected object OC to the server NS when the supplementary index reaches the limit value $is<IS=[N]$.

Another embodiment of the invention on the connected object side is notably a method for generating unique frames to be transmitted TU_GN by a connected object OC to a server NS via a low-power wireless communication network WLPN. The generation method TU_GEN comprises:
 a distribution DU_DTR of the payload data du in frames to be transmitted $\{t_j\}_j$ identifying the transmitting connected object, and
 an integration T_INT in a frame to be transmitted $tu_j=f(t_j)$ of at least
  a counter c that can be incremented as a function of the frame to be transmitted, the counter having a predefined dimension (c<C); and
  a supplementary index is that can be modified upon a zeroing of the counter CRZ.

In particular, the counter c is integrated in a frame header FHDR.

In particular, the supplementary index is integrated in one of the following elements of the frame:
 a frame header FHDR;
 a payload part of the frame FDU comprising the payload data du.

In particular, the method for generating unique frames to be transmitted TU_GN comprises an encryption CRY (not illustrated) of a payload part of the frame FDU comprising the payload data du.

In particular, the method for generating frames TU_GEN comprises the method for singularizing frames T_SNG. When a connected object implementing the singularization method T_SNG and/or the method for generating unique frames TU_GN initiates CNX_INT a connection with a server NS via a low-power wireless communication network WLPN relayed by the gateway GW over an Internet network IN to which the server NS is connected, the connected object OC sends a connection request jn (called join in the LoRa technology). To this connection request jn, the server NS sends a response jn_answ which possibly includes a random value $v=rnd(\ )$. In particular, this random value is a parameter AN allowing the connected object OC to encrypt the payload part of the frames that it transmits. This response jn_answ is notably transmitted by using the communication session established cnx_trg by the connected object OC with the server NS following the connection request jn. The initialization of the connection CNX_INT triggers init_trg an initialization of the singularities S_INIT (the singularities of the frame according to the invention comprise the counter c and the supplementary index is). This initialization of the singularities notably comprises the zeroing of the counter CRZ: c=0, and the initialization of the supplementary index IS_INIT such that the supplementary index is equal to a random value $is=rnd(\ )$. This initialization of the supplementary index IS_INIT consists either in the implementation of a random function by the connected object RND, or in the reception REC of a random value $v=rnd(\ )$ from the server NS.

In particular, the singularization method T_SNG and/or the method for generating unique frames comprises the zeroing of the counter CRZ by the initialization of the connection CNX_INIT and the initialization of the supplementary index IS_INIT.

The connected object OC recovers payload data du notably by picking them up or by generating them by analysis. The connected object OC processes the payload data du to transmit them to the server NS. Notably, the payload data du are distributed in frames DU_DTR or, more generally, frames to be transmitted $\{t_j\}_j$ comprising these payload data du are generated T_GEN:$t_j \supset$ du. The generation of frames to be transmitted T_GEN possibly comprises a distribution of the payload data in frames DU_DTR. Thus, for the first unique frame j=0 ? [Y], the counter c integrated T_INT in the frame $tu_0$ has a zero value c=0 and the supplementary index is integrated T_INT in the frame $tu_0$ is equal to the initial random value (notably received from the server NS) is=rnd( ).

For the subsequent frames j=0 ? [N], the counter is incremented c=c+1. In particular, the singularization method T_SNG and/or the method for generating unique frames TU_GN comprises the incrementation of the counter c=c+1. Then, there is a check to see if the value of the counter is less than its limit value c<C=[Y] making it possible to code the counter on the unique frame to be transmitted at the time of integration T_INT. The value of the supplementary index is integrated in these subsequent frames T_INT is identical to the value of the supplementary index is in the preceding frame. If the value of the counter is less than its limit value c<C=[N], then the counter is zeroed CRZ triggering a modification of the supplementary index IS_MDF.

In particular, the singularization method T_SNG and/or the method for generating unique frames comprises the checking of the value of the counter relative to its limit value c<C.

In particular, the modification of the supplementary index IS_MDF uses the preceding value of the supplementary index to determine a new value which is, for example, a monotonic function (notably an increasing function). In particular, the singularization method T_SNG and/or the method for generating unique frames comprises modification of the supplementary index IS_MDF. Then, there is a check to see if the value of the supplementary index conforms to the limit value, notably is less than its limit value is<IS=[Y] when the function is increasing, making it possible to code the supplementary index is on the unique frame to be transmitted upon the integration T_INT. The value of the supplementary index is integrated in this frame and the subsequent frames T_INT is the new value of the supplementary index is resulting from the modification IS_MDF. Otherwise, that is to say if the value of the supplementary index does not conform to the limit value, notably is not less than its limit value is <IS=[N] when the function is increasing, then the connection is reinitialized cnx_rz, that is to say that the checking of the supplementary index triggers cnx_rz an initialization of a new connection CNX_INT, possibly following a closure of the current connection. Thus, since the frames are transmitted in a new connection, the retransmission of frames transmitted in the preceding connection will be able to be detected by detection of change of connection, notably different connection identifier or encryption key, etc.

In particular, the method for generating unique frames TU_GEN comprises the method for generating frames to be transmitted T_GEN.

In particular, the connected object implements a communication method $DU_{OC}$_COM comprising a transmission of frames TR comprising payload data $t_j$ $tu_j$. Notably, the communication method $DU_{OC}$_COM comprises the initialization of connection CNX_INT with the server NS via the low-power wireless communication network WLPN.

Possibly, the communication method $DU_{OC}$_COM comprises a distribution of the payload data in frames DU_DTR and/or a singularization method T_SNG and/or a generation of frames to be transmitted T_GEN and/or a method for generating unique frames TU_GEN. Thus, the server NS implements a method for loading connected object data $DU_{OC}$_LD receiving the frames transmitted by connected objects via a low-power wireless communication network. This loading method notably comprises the sending of a response to a connection request jn_answ comprising a random value v=rnd( ) and the reception of frames $t_j$, $tu_j$.

Possibly, the gateway GW implements a detection of retransmitted frames RPL_DTCT making it possible to transmit to the server NS only the frames detected as not retransmitted, that is to say received by the gateway directly from a connected object.

Figure 3:
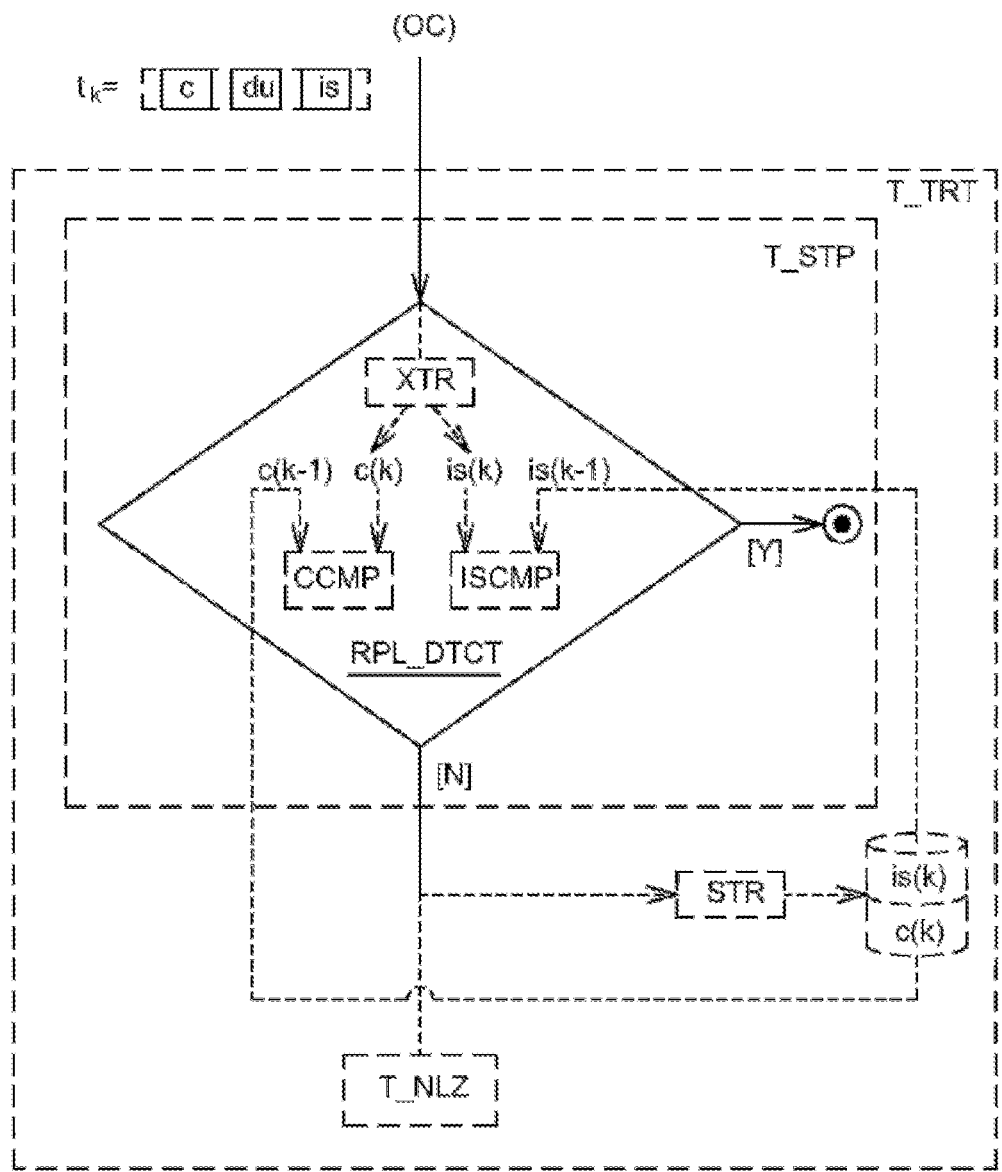

FIG. 3 illustrates a simplified diagram of a method for blocking retransmitted frames and of a method for processing received frames according to the invention. The method for blocking retransmitted frames T_STP is implemented by a communication device GW receiving the frames, the communication device being connected to at least one connected object OC, from a connected object via a low-power wireless communication network WLPN. Notably, the communication device is a gateway GW of a communication architecture using a low-power wireless communication network WLPN capable of implementing the blocking method T_STP. Or, possibly, the communication device is a server NS of a communication architecture using a low-power wireless communication network WLPN capable of implementing the blocking method T_STP. The method for blocking retransmitted frames T_STP comprises a detection of the frames retransmitted RPL_DTCT from among the frames received by the communication device GW, NS from a connected object OC identified in the frame received via the low-power wireless communication network WLPN by comparison CCMP of the counter c(k) and of the supplementary index ISCMP of a received frame is(k) with, respectively, the counter c(k−1) and the supplementary index is(k−1) of a preceding received frame from the same connected object OC.

In particular, the detection of retransmitted frames RPL_DTCT is positive [Y] when:
 the counter of the received frame is less than or equal to the counter of the preceding received frame c(k)<c(k−1) and when the supplementary index is equal to or has a value relative to the supplementary index of the preceding frame corresponding to a function that is the inverse of the monotonic function used to singularize the frames to be transmitted, for example is(k)<is(k−1) for an increasing function;
 the counter of the received frame is greater than the counter of the preceding received frame c(k)>c(k−1) and when the supplementary index has a value relative to the supplementary index of the preceding frame corresponding to a function that is the inverse of the monotonic function used to singularize the frames to be transmitted, for example is(k)<is(k−1) for an increasing function.

When the detection of retransmission RPL_DTCT is positive [Y], the received frame tk is blocked, that is to say that it is not transmitted to the server NS when the detection is implemented by the gateway GW, thus making it possible to avoid an overloading of the Internet network and of the server linked to excessive retransmissions or that the payload data of the frame are not processed by the server, that is to say analyzed and/or stored, avoiding the overload in terms of computation cost or memory, when the detection is implemented by the server NS.

In particular, at the end of the detection RPL_DTCT, when a retransmission has not been detected [N], the counter of the received frame c(k) and, when the supplementary index differs from that of the frame previously received according to a monotonic function of the same order as that used to singularize the frames to be transmitted, for example is(k)>is(k−1) for an increasing function, the supplementary index is(k), are stored STR in the communication device GW, NS implementing the method for blocking retransmitted frames.

The detection of retransmission RPL_DTC can also be implemented by a method for processing frames received by a communication device connected to at least one connected object via a low-power wireless communication network. The processing method is generally implemented by the server NS, but can also be implemented by a gateway GW. The method for processing received frames T_TRT comprises a detection of the retransmitted frames RPL_DTCT from among the frames received by the communication device from a connected object identified in the received frame via the low-power wireless communication network by comparison of the counter and of the supplementary index of a received frame with, respectively, the counter and the supplementary index of a preceding received frame from the same connected object, the detection RPL_DTCT transmitting to the analysis T_NLZ of the method for processing of the received frames the frames for which a retransmission has not been detected.

Possibly, the detection of retransmission RPL_DTC comprises an extraction XTR of the counter c and of the supplementary index of the received frames, the extraction XTR supplies the extracted values c(k) and is(k) to the comparisons, respectively of counter CCMP and of supplementary index ISCMP.

An embodiment of one or more of the methods described by way of example by FIGS. 2 and 3 is a program comprising program code instructions for the execution of the steps of the method for singularizing frames to be transmitted or of the method for generating unique frames to be transmitted or of the method for blocking retransmitted frames or of the method for processing received frames when said program is executed by a processor.

Figure 4A:
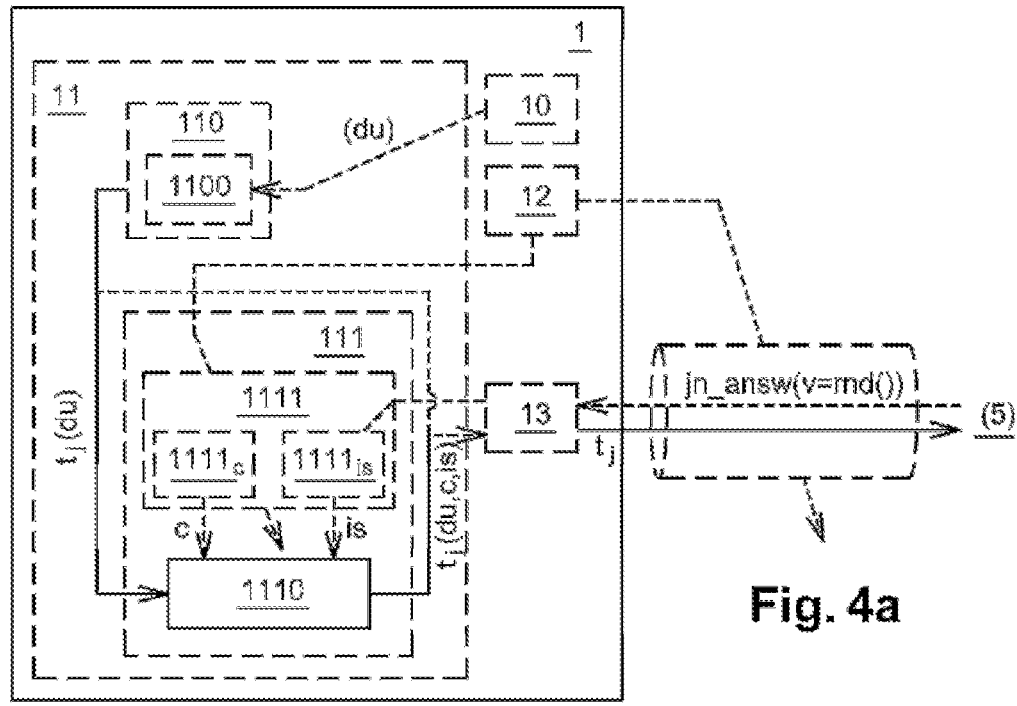
Figure 4B:
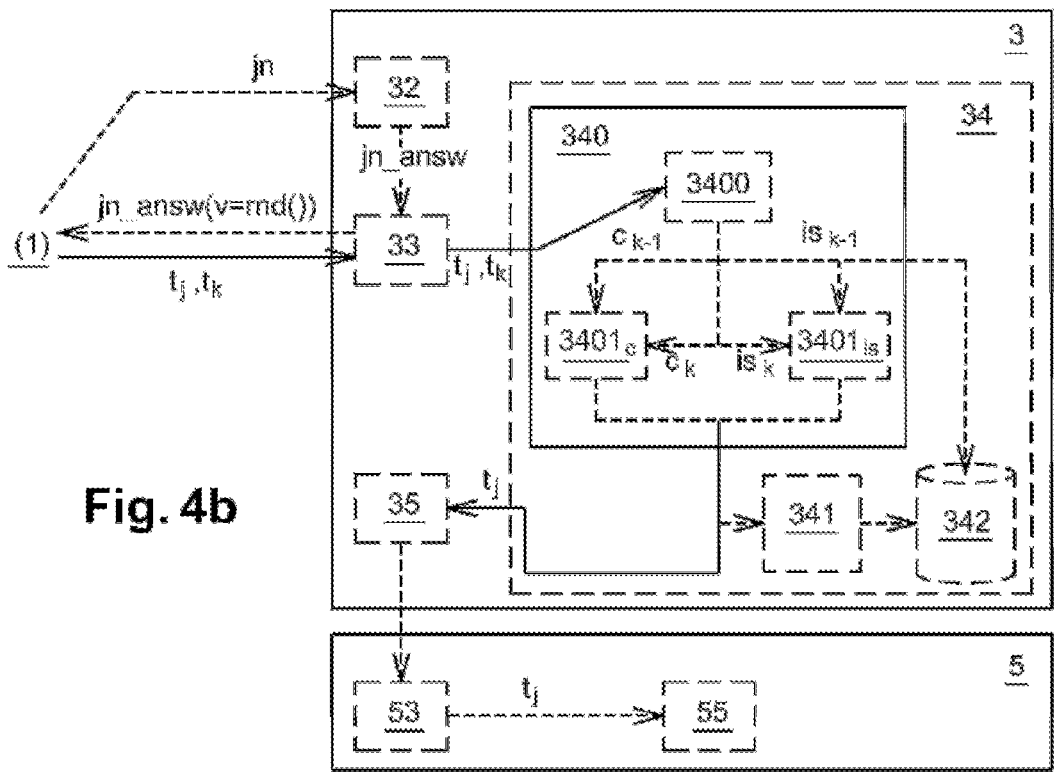

FIGS. 4a, 4b and 4c illustrate simplified diagrams of the communication devices implemented in a communication architecture using a low-power wireless communication network.

FIG. 4a illustrates a simplified diagram of a generator of unique frames to be transmitted and of a connected object according to the invention. A generator of unique frames to be transmitted 11 by a connected object 1 to a server 5 via a low-power wireless communication network, the generator 11 comprises:
  a distributor 1100 of the payload data du in frames to be transmitted identifying the transmitting connected object, and
  an integrator 1110 in a frame to be transmitted $t_j(du)$ of at least:
    a counter c that can be incremented as a function of the frame to be transmitted, the counter having a predefined dimension; and
    a supplementary index is that can be modified upon a zeroing of the counter.

In particular, the generator of unique frames to be transmitted 11 comprises a frame generator 110 receiving payload data and supplying frames comprising these payload data to the integrator 1110.

In particular, the generator of unique frames to be transmitted 11 comprises a generator of singularities 1111 providing the integrator 1110 with a counter c and a supplementary index is. The singularity generator notably comprises a counter modifier 1111c comprising an incrementor and a supplementary index modifier 1111 is implementing a monotonic function. The counter modifier 1111c comprises, in particular, a counter resetter setting the value of the counter to zero as a function of the value at the output of the incrementor (when the incremented value reaches a maximum value of the counter C). The supplementary index modifier 1111 is controlled by the counter resetter. Possibly, when the modified value is greater than or equal to a maximum value of the supplementary index IS, the supplementary index modifier does not supply a modifying supplementary index but triggers a resetting of the connection of the connected object 1 with the server 5.

In particular, the architecture for transmission of frames over a low-power wireless communication network comprises an object 1 connected to a server 5 via a low-power wireless communication network. The connected object comprises an integrator 1110 making it possible to supply unique frames to be transmitted comprising in addition to the payload data:
  a counter that can be incremented as a function of the frame to be transmitted, the counter having a predefined dimension; and
  a supplementary index that can be modified upon a zeroing of the computer.

In particular, the connected object comprises at least one sensor 10 supplying payload data du. The sensor 10 possibly performs a processing of the data picked up. The payload data supplied by the sensor 10 are then made up of data picked up and/or of data picked up and processed.

In particular, the generator of unique frames to be transmitted 11 comprises a distributor of payload data in frames 1100 and/or a generator of frames 110 receiving payload data and supplying frames comprising these payload data to the integrator 1110.

In particular, the connected object comprises a generator of singularities 1111 supplying the integrator 1110 with a counter c and a supplementary index is. The singularity generator notably comprises a counter modifier 1111c comprising an incrementor and a supplementary index modifier 1111 is implementing a monotonic function. The counter modifier 1111c comprises, in particular, a counter resetter setting the value of the counter to zero as a function of the value at the output of the incrementor (when the incremented value reaches a maximum value of the counter C). The supplementary index modifier 1111 is controlled by the counter resetter. Possibly, when the modified value is greater than or equal to a maximum value of the supplementary index IS, the supplementary index modifier does not supply a modified supplementary index but triggers a resetting of the connection of the connected object 1 with the server 5.

In particular, the connected object 1 comprises a generator of unique frames to be transmitted 11 comprising:
  a distributor 1100 of the payload data in frames to be transmitted identifying the transmitting connected object, and
  an integrator 1110 in a frame to be transmitted of at least:
    a counter that can be incremented as a function of the frame to be transmitted, the counter having a predefined dimension; and
    a supplementary index that can be modified upon a zeroing of the counter.

In particular, the connected object 1 comprises a connection device 10 that can transmit a connection request to a server 5 via the low-power wireless communication network jn. The connected object 1 comprises a low-power wireless transmitter 12 that can receive a response to this connection request jn_answ notably comprising a random value v=rnd( ). In particular, the random value received is used by the supplementary index modifier $1111_{is}$ to initialize the supplementary index is=v=rnd( ) upon the initialization of the connection.

In particular, upon the initialization of the connection by the connection device 10, the counter modifier 1111c sets the counter to zero c=0. The connected object 1 can thus transmit either, as in the prior art, frames tj generated by a generator of frames to be transmitted 110, or, according to the invention, unique frames $tu_j$ (du, c, is) supplied by the integrator 1110 by means of the low-power wireless transmitter 13.

FIG. 4b illustrates a simplified diagram of a frame reception architecture comprising a gateway, a server, and possibly a frame block filter according to the invention. A retransmitted frames block filter 34 receives frames tj, tk from a connected object 1 via a low-power wireless communication network. The retransmitted frames block filter 34 comprises a detector of the retransmitted frames 340 from among the frames received from a connected object identified in the frame received via the low-power wireless communication network by comparison of the counter and of the supplementary index of a received frame with, respectively, the counter and the supplementary index of a preceding received frame from the same connected object.

In particular, the detector of retransmitted frames 340 comprises a counter comparator 3401c and a supplementary index comparator 3401 is implementing the respective comparisons.

In particular, the detector of retransmitted frames 340 comprises an extractor 3400 recovering, in a received frame tk, the counter ck and the supplementary index isk for the respective comparisons.

In particular, the frames block filter 34 comprises a memory 342 in which the counter and the supplementary index of the preceding frame are read.

In particular, the frames block filter 340 comprises a recorder 341 triggered by the detector of retransmitted frames 340 when it does not detect retransmission to store the counter and the supplementary index of the received frame. The frames block filter 34 supplies only the received frames for which the detector of retransmitted frames 340 has not detected retransmission. Thus, the frames block filter can also be called frame omission filter because it omits to transmit the retransmitted frames.

In a particular embodiment illustrated by FIG. 4b, a gateway 3 of a low-power wireless communication network receiving frames from a connected object 1 intended for a server connected to an Internet network comprises the detector of retransmitted frames 340. Notably, the gateway 3 comprises the retransmitted frames block filter 34. The server 5 comprises an analyzer 55 of the payload data of the received frames. The filter 34 is placed upstream of the analyzer 55 and comprises the detector of the retransmitted frames 340 from among the frames received by the gateway 3 from a connected object 1 identified in the frame received via the low-power wireless communication network by comparison of the counter and of the supplementary index of a received frame with, respectively, the counter and the supplementary index of a preceding received frame from the same connected object.

In particular, the gateway 3 comprises a connection device 32 that can receive a connection request jn from a connected object 1. In response to the connection request jn, the connection device 32 directly or indirectly provides a response jn_answ possibly comprising a random value v=rnd( ) to a low-power wireless transmitter 33 of the gateway 3. Indirectly is understood to mean that the connection device 32 relays, notably by means of an Internet transmitter 35 via the Internet network, the connection request jn to the server 5 which provides the response jn_answ to the gateway which relays it via the low-power wireless network to the connected object.

In particular, the gateway 3 comprises a low-power wireless transmitter 33 that can receive the frames transmitted $t_j$, $t_k$ by the connected object 1, and an Internet transmitter 35 that can transmit to the server via the Internet network the received frames not blocked by the frames block filter 34 or detected as not retransmitted by the retransmitted frames detector 340. The server 5 notably comprises an Internet transmitter 53 that can receive the frames that are not blocked tj. The Internet transmitter 53 provides the frames that are not blocked because they are not retransmitted to the analyzer 55.

FIG. 4c illustrates a simplified diagram of a frame reception architecture comprising a server 5, and possibly a frames block filter 34 according to the invention. A retransmitted frames block filter 34 receives frames tj, tk from a connected object 1 via a low-power wireless communication network. The retransmitted frames block filter 34 comprises a detector of the retransmitted frames 340 from among the frames received from a connected object identified in the frame received via the low-power wireless communication network by comparison of the counter and of the supplementary index of a received frame with, respectively, the counter and the supplementary index of a preceding received frame from the same connected object.

In particular, the retransmitted frames detector 340 comprises a counter comparator 3401c and a supplementary index comparator 3401 is implementing the respective comparisons.

In particular, the detector of retransmitted frames 340 comprises an extractor 3400 recovering, in a received frame tk, the counter ck and the supplementary index isk for the respective comparisons.

In particular, the frames block filter 34 comprises a memory 342 in which the counter and the supplementary index of the preceding frame are read.

In particular, the frames block filter 340 comprises a recorder 341 triggered by the detector of retransmitted frames 340 when it does not detect retransmission to store the counter and the supplementary index of the received frame. The frames block filter 34 provides only the received frames for which the detector of retransmitted frames 340 has not detected retransmission.

In a particular embodiment illustrated by FIG. 4c, a server 5 of an Internet network receives frames from a connected object 1 via a low-power wireless communication network. The server 5 receives frames from a connected object 1 via a low-power wireless communication network. Furthermore, the server 5 comprises an analyzer 55 of the payload data of the received frames. The server 5 comprises a detector of retransmitted frames 540. Notably, the server 5 comprises the retransmitted frames block filter 54, also called retransmitted frames omission filter. The filter 54 is placed upstream of the analyzer 55 and comprises the detector of retransmitted frames 540 from among the frames received by the server 5 from a connected object 1 identified in the frame received via the low-power wireless communication network by comparison of the counter and of the supplementary index of a received frame with, respectively, the counter and the supplementary index of a preceding received frame from the same connected object.

In particular, the server 5 comprises a connection device 52 that can receive a connection request jn from a connected object 1. In response to the connection request jn, the connection device 52 provides a response jn_answ possibly comprising a random value v=rnd( ) to an Internet transmitter 53 of the server 5.

In particular, the server 5 comprises an Internet transmitter 53 that can receive, on the server via the Internet network, the frames from a connected object via a low-power wireless communication network and relay by a gateway (not illustrated) over the Internet network.

FIGS. 5a to 5d illustrate simplified diagrams of frames and requests exchanged by an object connected to a low-power wireless communication network.

FIG. 5a illustrates a frame to be transmitted, notably according to the LoRa standard. A message m transmitted by a connected object OC comprises a message header MHDR, payload data of the message MDU, also called MACPayload in the LoRa standard, and a message integrity code MIC. The payload data of the message MDU comprise one or more data frames t. A frame t is composed of several data blocks: a first block forming a frame header FHDR, a second block forming an address associated with the frame FP, also called FPort in the case of a LoRa frame, and a third block comprising the payload data of the frame FDU including the payload data du that the connected object transmits via the low-power wireless communication network, notably data picked up by the connected object, also called FRMPayload or Frame payload in the case of a LoRa frame. The frame header FHDR notably comprises an identifier of the connected object, such as an address of the connected object, OAD, also called DevAddr in the case of a LoRa frame, a frame controller FCT, also called FCtrl in the case of a LoRa frame, a counter c, also called Counter or FCnt in the case of a LoRa frame, and frame options FOpts. The counter c is notably a counter allowing a communication device receiving the frame t to detect the loss of frames. Some standards of transmission over low-power wireless communication networks, such as the LoRaWAN standard, have, in their protocol, a counter which self-increments with the sending of a new frame. This counter as a general rule makes it possible to check whether frames have been lost in the transmission to the server. In one embodiment, this counter c can also be used as the counter of the invention, that is to say as one of the two singularities allowing a communication device receiving the frames to detect a retransmitted frame. No standard provides for the frame loss detection counter to be able to be used to validate the fact that a frame comprising a value already used is exceeded and therefore invalid. Notably, the frame loss detection counter is not used to check the order of the frames received because:

1°) this frame loss detection counter is not necessarily stored permanently on the connected object triggering a restarting of the counter at zero upon the reactivation of the connected object after a power-down.

2°) this counter is generally coded on a small number of bits: 16 bits, which means, for a connected object having a short transmission period (every 5 minutes for example), that the counter will have performed a complete cycle in scarcely 7 months. If the counter is incremented indefinitely as a function of the frame, a frame could be detected as retransmitted by comparing its value to the preceding one, the received frame not being valid (because it is considered as retransmitted) only if the counter is strictly greater than the counter of the preceding received frame. The counter being reset regularly (power down, short counter cycle), a supplementary index makes it possible to overcome these resettings of the counter for detection of the retransmission of a frame. The second singularity allowing the communication device receiving the frames to detect a retransmitted frame is a supplementary index.

FIG. 5b illustrates a first example of integration of the supplementary index in the unique frame to be transmitted according to the invention. In this first example, the frame header comprises, in addition to the counter c, the supplementary index is.

FIG. 5c illustrates a second example of integration of the supplementary index in the unique frame to be transmitted according to the invention. In this second example, the supplementary index is integrated in the payload data block of the frame FDU with the payload data du. Thus, when the connected object encrypts the payload data block FDU, not only the payload data du but also the supplementary index is encrypted, reducing the possibility for a malicious third-party to modify the supplementary index is before retransmitting the frame.

Thus, FIGS. 5a to 5c illustrate a unique frame t according to the invention. This unique frame t is generated by a connected object OC and transmitted over a low-power wireless communication network WLPN. The unique frame t identifying the transmitting connected object OAD and comprising, in addition to the payload data du:
  a counter c incremented as a function of the frame, the counter having a predefined dimension; and
  a supplementary index is modified upon a zeroing of the counter.

In particular, the counter c is inscribed on 2 bytes of this frame like the counter allowing the detection of loss of frames of the LoRa standard.

FIG. 5d illustrates a response to a connection request, notably according to the LoRa standard. Upon the initialization of a connected object OC, that is to say when it is powered up, the connected object OC requests a connection jn with a network server NS, this connection request is called JOIN in the LoRa standard. It allows the connected object OC to be authenticated with the network server NS. The network server NS responds notably to accept the connection, for example in the form of a Join Accept according to the LoRa standard, by returning different information, notably in the form of the response jn_answ illustrated by FIG. 5d.

In particular, the returned information makes it possible to generate one or more encryption keys such as a network encryption key, also called NwsKey by certain standards of transmission over low-power wireless communication networks, (that is to say, a transmission encryption key allowing the server receiving the frame to decrypt it), and/or an application encryption key, also called AppsKey by certain standards of transmission over low-power wireless communication networks, (that is to say an encryption key allowing the processing operation or service using the payload data transported by the frame to decrypt them).

In particular, the response message jn_answ comprises a random value v=rnd( ) constituting a parameter AN of generation of at least one encryption key (for example the network encryption key and/or the application encryption key), this parameter AN is also called AppNonce in the case of a LoRa message. This parameter AN is different on each new connection. The counter is reset to zero while being safeguarded from repeatability because the encryption key(s) differs (differ) on each new subscription (Join Request). This response jn_answ also comprises, notably, a network identifier Nid, also called NetID in the case of a LoRa message, and/or an identifier of the connected object OAD, also called DevAddr in the case of a LoRa message, and/or transmission parameters DLS, also called DLSettings in the case of a LoRa message, and/or a reception delay RxΔ, also called RxDelay in the case of a LoRa message, and/or a list of additional transmission frequencies CFL, also called CFList in the case of a LoRa message. This encryption key generation parameter AN can be used by the invention to initialize the supplementary index is upon the initialization of the connected object or the resetting of the connection. It is then said that the value of the encryption key generation parameter used as supplementary index makes it possible to "salt" the frames sent. To allow a detection of retransmitted frames on the reception side, processing operations are performed on the connected object OC side to, notably, integrate a counter and supplementary index in the frames to be transmitted.

Figure 6:
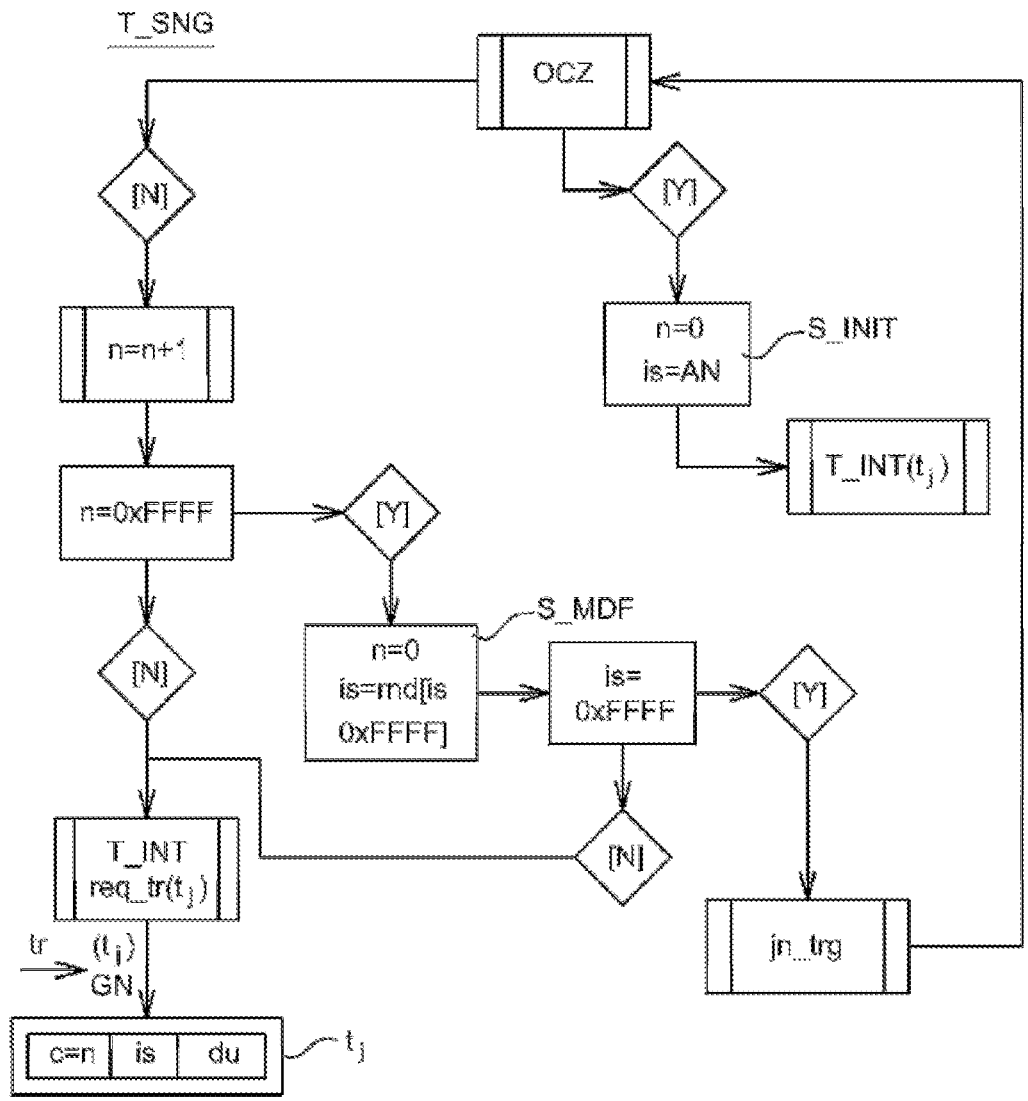

FIG. 6 illustrates a simplified diagram of a flow diagram of a method for singularizing frames to be transmitted T_SNG according to the invention implementing these processing operations on the connected object OC side. The singularization method T_SNG comprises an initialization of the singularities S_INIT triggered by the initialization of the connected object OCZ [Y]. The singularities comprise, in particular, the counter c and the supplementary index is according to the invention. Notably, the initialization of the singularities S_INIT comprises the zeroing of the counter c (if n is the value of the counter c, n=0) and the initialization of the supplementary index is with a random value, notably the value of an encryption key generation parameter AN supplied by the server in its response to the connection request (is=AN). The singularization method T_SNG integrates T_INT($t_j$) this counter c=0 and the supplementary index is=AN in the frame to be transmitted $t_j$ making it possible to generate a unique frame which will be transmitted over the low-power wireless communication network. When the frame is not the first frame transmitted over a connection, that is to say that it does not occur [N] directly after the initialization of the connected object OCZ, the singularization method T_SNG comprises an incrementation of the counter c to the value n=n+1 then a verification of the value of the counter relative to a limit value set by the dimension of the counter in the frame (n=0xFFFF when the counter is coded on 2 bytes). If the value n of the counter does not reach the limit [N], the singularization method T_SNG integrates T_INT the new value n of the counter c and the supplementary index is (of a value identical to the supplementary index of the preceding frame) in the frame currently being generated making it possible to generate a unique frame which will be transmitted over the low-power wireless communication network. In particular, the singularization method comprises a transmission of a request for transmission req_tr($t_j$) of the duly generated unique frame to the low-power wireless transmitter of the connected object OC. The unique frame generated $t_j$ is transmitted to the gateway $tr_{\rightarrow GW}(t_j)$. It comprises the counter c=n, the supplementary index is and the payload data du. If the value n of the counter reaches the limit [Y], the singularization method T_SNG comprises a modification of the singularities S_MDF. The modification of the singularities comprises in particular a zeroing of the value n of the counter c: n=0. The zeroing of the counter c notably triggers a modification of the supplementary index is, for example according to a monotonic function (such as an increasing function). FIG. 6 illustrates a modification of the supplementary index according to an increasing random function: is=rnd[is, 0xFFFFFF], for a supplementary index coded on 3 bytes. Then, the new value of the supplementary index, different from its current value, is a random value lying between the current value of the supplementary index and limit value of the supplementary index set notably by the dimension of the data block on which the supplementary index is coded in the frame. If the new value of the supplementary index is does not reach the limit is=0xFFFFFF [N], then the singularization method T_SNG integrates T_INT the new value n of the counter c (n=0) and the supplementary index is (of a value modified relative to the supplementary index of the preceding frame) in the frame currently being generated making it possible to generate a unique frame which will be transmitted over the low-power wireless communication network. In particular, the singularization method comprises a transmission of a request for transmission req_tr($t_j$) of the duly generated unique frame to the low-power wireless transmitter of the connected object OC. The unique frame generated $t_j$ is transmitted to the gateway $tr_{\rightarrow GW}(t_j)$. It comprises the count c=n, the supplementary index is and the payload data du. If the new value of the supplementary index is reaches the limit is=0xFFFFFF [Y], then the singularization method T_SNG triggers a new connection jn_trg: OCZ. The payload data of the frame to be transmitted currently being processed will be transmitted on this new connection for which the singularities will have been reinitialized S_INIT, therefore the unique frame transmitted over this new connection will comprise, in addition to the payload data du, the counter c with a value n=0 and a supplementary index with an initial value corresponding to a new encryption key generation parameter is=AN. If the connected object has been restarted OCZ, it sends a connection request jn, then recovers a random value notably in an encryption key generation parameter AN, such as the block AppNonce of a connection acceptance message according to the LoRa standard. The connected object then initializes the singularities, notably by setting the counter c to a value n equal to zéro: n=0, and by giving the supplementary index the random value of the encryption key generation parameter AN: is=AN. Then the connected object OC integrates these singularities (n=0, is=AN) in the frame before transmitting it via the low-power wireless communication network. Otherwise, the generation of a new frame triggers an incrementation of the value n of the counter c: n=n+1. If this value differs from 0xFFFF for a counter c coded on 2 bytes of a frame t, then the counter c with its new value n=n+1 and the supplementary index is (identical to that of preceding frame generated) are integrated in the new frame before the connected object transmits it via the low-power wireless communication network. Otherwise, the value n of the counter c is reset to zero: n=0 and the value of the supplementary index is modified, notably the connected object randomly generates a supplementary index lying between the value of the preceding supplementary index (this value being excluded) and the maximum value of the supplementary index determined by the dimension of the supplementary index coded in the frame, for example, for a supplementary index coded on 3 bytes: a maximum supplementary index value of 0xFFFFFF. If the new supplementary index reaches the maximum value, then the connected object requests a new connection jn (it can be said, incorrectly, that it performs a new Join in the case of the LoRa standard), then the reset singularities (n=0, is=AN') are integrated in the frame before being transmitted. Otherwise, the connected object integrates the counter reset to zero n=0 and the supplementary index with its new value is=rnd [is, 0xFFFFFF] in the frame before transmitting it.

Figure 7:
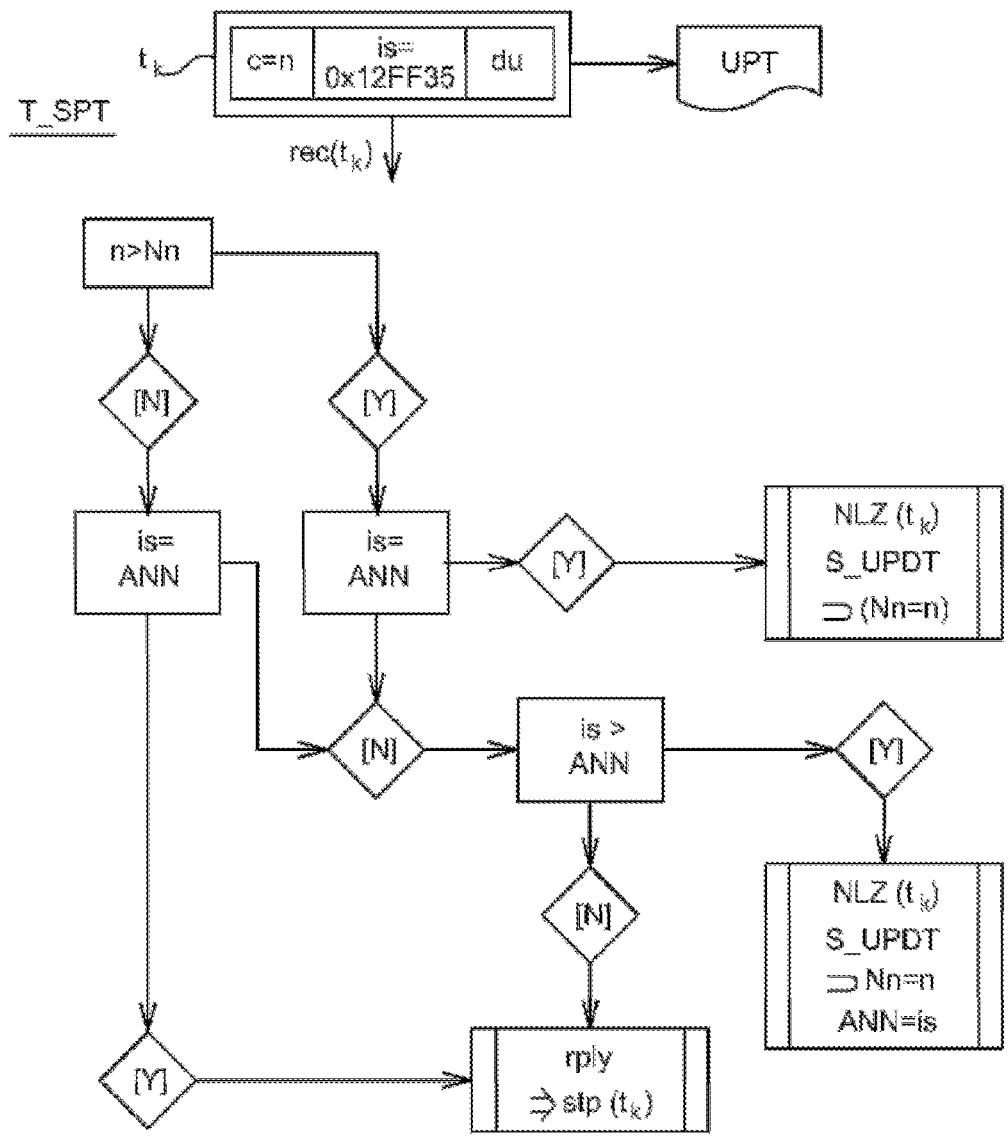

FIG. 7 illustrates a simplified diagram of a flow diagram of a method for blocking retransmitted frames according to the invention. It describes more generally an exchange of frame via a low-power wireless communication network, in particular a LoRa frame exchange. The blocking method T_STP receives frames tk received rec($t_k$) by a communication device, notably a gateway, and notably comprising a counter c with a value n, a supplementary index is (with a value 0x12FF35 in the example of FIG. 7), and payload data. The transmission of the frame tk leads to the updating of the UPT variables in the connected object OC (modification of the singularities S_MDF, in particular incrementation of the counter n=n+1). The blocking method checks the value n of the counter c received relative to the counter value of the preceding received frame Nn: n>Nn. If the value of the counter c received is greater than the counter value of the preceding received frame n>Nn [Y] then the blocking method checks the value of the supplementary index is received relative to a supplementary index value of the preceding received frame ANN: is=ANN. If these two supplementary index values are identical is=ANN [Y], the method for blocking frames transmits the received frame notably to the frame analysis NLZ(tk). In order to more easily access the singularities of the frame for the implementation of the blocking method, the latter can be stored in the communication device as network singularities: the network counter constitutes the counter of the preceding received frame and the network supplementary index constitutes the supplementary index of the preceding received frame. In this case, if the two supplementary index values are identical is=ANN [Y], after the transmission by the method for blocking the received frame, the blocking method T_STP updates the values of the singularities stored by the communication device UP S_UPDT, in this case the network counter Nn takes the value n of the counter received c: Nn=n. The detection of a counter value greater than that of the preceding frame and of an identical supplementary index shows that the received frame has indeed been transmitted after the preceding received frame. This detection of transmission after the preceding received frame is used to determine that the received frame is not a retransmitted frame. By contrast, if the two supplementary index values are not identical is=ANN [N], the method for blocking frames checks the relative value of the two supplementary indices relative to the monotonic function used to modify the supplementary index by the connected object. For example, when the monotonic function is an increasing function, the method for blocking frames checks to see if the received supplementary index is greater than the supplementary index of the preceding frame ANN. If such is the case [Y], the method for blocking frames transmits the received frame notably to the frame analysis NLZ(tk). In the case where the singularities of the preceding received frame are stored in network singularities, after the transmission by the method for blocking the received frame, the blocking method T_STP updates the values of the singularities stored by the communication device UP S_UPDT, in this case the network counter Nn takes the value n of the received counter c: Nn=n, and the network supplementary index ANN takes the received supplementary index is: ANN=is. The detection of a counter value greater than that of the preceding frame and of an identical supplementary index complying with the monotonic function shows that the received frame has indeed been transmitted after the preceding received frame. This detection of transmission after the preceding received frame is used to determine that the received frame is not a retransmitted frame. If the relative value of the two supplementary indices does not comply with the monotonic function used to modify the supplementary index by the connected object, in the example of FIG. 7: is>ANN [N], then the method for blocking frames T_STP detects a retransmission rply=[Y] and blocks the retransmitted frame concerned stp(tk), that is to say does not transmit the received frame. The detection of a counter value greater than that of the preceding frame and of a different supplementary index not complying with the monotonic function shows that the received frame has been transmitted with a batch of frames corresponding to the supplementary index of the received frame sent prior to the preceding received frame and therefore retransmitted by a third-party communication device subsequent to this first transmission. This detection of transmission prior to the preceding received frame is used to determine that the received frame is a retransmitted frame. If the value of the received counter c is not greater than the counter value of the preceding received frame n>Nn [N], then the blocking method checks the value of the supplementary index is received relative to a supplementary index value of the preceding received frame ANN: is=ANN. If these two supplementary index values are identical is=ANN [Y], the method for blocking frames blocks the received frame stp(tk) because it detects a retransmission rply=[Y]. By contrast, if the two supplementary index values are not identical is=ANN [N], the method for blocking frames checks the relative value of the two supplementary indices relative to the monotonic function used to modify the supplementary index by the connected object. If the relative value of the two supplementary indices does not comply with the monotonic function used to modify the supplementary index by the connected object, in the example of FIG. 7: is>ANN [N], then the method for blocking frames T_STP detects a retransmission rply=[Y], and blocks the retransmitted frame concerned stp(tk), that is to say does not transmit the received frame. If such is the case [Y], the method for blocking frames transmits the received frame notably to the fame analysis NLZ(tk). In the case where the singularities of the preceding received frame are stored in network singularities, after the transmission by the method for blocking the received frame, the blocking method T_STP updates the values of the singularities stored by the communication device UP S_UPDT, in this case the network counter Nn takes the value n of the received counter c: Nn=n, and the network supplementary index ANN takes the received supplementary index is: ANN=is. Indeed, the detection of a counter less than that of the preceding frame indicates either a retransmission of a frame transmitted before the preceding received frame (which serves as reference) of the same cycle of the counter when the supplementary index is identical, or the reception of a frame of another cycle of the counter, in which case it is necessary to check whether it is a cycle following the cycle of the preceding received frame or a cycle preceding the cycle of the preceding received frame (in the second case, there will then also have been retransmission).

Assume that the connected object OC sends an nth frame. This nth frame comprises, in addition to the payload data du, a counter c of value n and a supplementary index is. These two variables are, for example, stored on the reception side, notably in the network server or in the gateway when the frame blocking is implemented by the gateway, notably in the form of a network counter Nn and of a network supplementary index ANN. The first variable Nn corresponds to the last counter value n received from the connected object OC and processed by the server NS, that is to say to the counter of the preceding received frame. The second variable corresponds to the supplementary index value of the connected object OC. If n<Nn, that is to say that the counter of the received frame is less than the network counter corresponding to the counter of the preceding received frame, and is=ANN, that is to say that the supplementary index of the received frame is identical to the network supplementary index corresponding to the supplementary index of the preceding received frame, then the received frame is detected as retransmitted. It is then rejected by, respectively, the server or the gateway, and will not therefore be processed by the server (that is to say, neither analyzed nor stored). If n>Nn, that is to say that the counter of the received frame is greater than the network counter corresponding to the counter of the preceding received frame, and is<ANN, that is to say that the supplementary index of the received frame is less (in the case of a supplementary index varying according to an increasing function) than the network supplementary index corresponding to the supplementary index of the preceding received frame, then the received frame is, here too, detected as retransmitted. It is then rejected by, respectively, the server or the gateway, and will not therefore be processed by the server (that is to say neither analyzed nor stored). If n>Nn, that is to say that the counter of the received frame is greater than the network counter corresponding to the counter of the preceding received frame, and is=ANN, that is to say that the supplementary index of the received frame is identical to the network supplementary index corresponding to the supplementary index of the preceding received frame, then the received frame is detected as correct. It can then be transmitted by, respectively, the server or the gateway to subsequent processing operations of the server (that is to say analyzed and/or stored). Then, the network counter is, if appropriate, updated with the counter value from the received frame: Nn=n. If n>Nn, that is to say that the counter of the received frame is greater than the network counter corresponding to the counter of the preceding received frame, and is>ANN, that is to say that the supplementary index of the received frame is greater (in the case of a supplementary index varying according to an increasing function) than the network supplementary index corresponding to the supplementary index of the preceding received frame, then the received frame is detected as correct. It can then be transmitted by, respectively, the server or the gateway to the subsequent processing operations of the server (that is to say analyzed and/or stored). Then, the network singularities are, if appropriate, updated:

the network counter is updated with the counter value of the received frame: Nn=; and the network supplementary index is updated with the value of the supplementary index of the received frame: ANN=is.

The invention makes it possible to avoid having the server process frames already received, even having the gateway relay to the gateway frames already sent. Thus, the invention prevents the problems associated with the integrity of the data.

The invention also targets a medium. The information medium can be any entity or device capable of storing the program. For example, the medium can comprise a storage means, such as a ROM, for example a CD ROM or a microelectronic circuit ROM or even a magnetic storage means, for example a diskette or a hard disk. Also, the information medium can be a transmissible medium such as an electrical or optical signal which can be routed via an electrical or optical cable, by radio or by other means. The program according to the invention can in particular be downloaded over a network, notably of Internet type. Alternatively, the information medium can be an integrated circuit in which the program is incorporated, the circuit being adapted to execute or to be used in the execution of the method concerned.

In another implementation, the invention is implemented by means of software and/or hardware components. In this respect, the term module can correspond equally to a software component or to a hardware component. A software component corresponds to one or more computer programs, or several subprograms of a program, or, more generally, to any element of a program or software capable of implementing a function or a set of functions according to the above description. A hardware component corresponds to any element of a hardware assembly capable of implementing a function or a set of functions.

Although the present disclosure has been described with reference to one or more examples, workers skilled in the art will recognize that changes may be made in form and detail without departing from the scope of the disclosure and/or the appended claims.

The invention claimed is:

1. A method comprising:
    processing frames received by a communication device, which is connected to a connected object via a low-power wireless communication network, wherein the processing comprises:
    detecting retransmitted frames from among frames received by the communication device from the connected object identified in each frame received via the low-power wireless communication network by comparing a counter and a supplementary index of the received frame with, respectively, a counter and a supplementary index of a preceding received frame from the connected object, and
    transmitting for analysis the received frames for which a retransmission has not been detected.

2. The method as claimed in claim 1, comprising further the following acts performed by the communication device:
    receiving the frames transmitted by the connected object via the low-power wireless communication network, the frames identifying the connected object and comprising payload data, and the frames integrating at least:
        the counter, which can be incremented according to the frame to be transmitted, the counter having a predefined dimension; and
        the supplementary index, which can be modified upon a zeroing of the counter;
    receiving the retransmitted frames identifying the connected object and integrating the counter and the supplementary index;
    blocking the retransmitted frames by:
    performing the detecting of the retransmitted frames from among frames received from the connected object.

3. The method as claimed in claim 2, wherein a result of the detecting of the retransmitted frames is positive when:
    the counter of the received frame is less than or equal to the counter of the preceding received frame and when the supplementary index is equal to or has a value relative to the supplementary index of the preceding frame corresponding to a function that is the inverse of the monotonic function used to singularize the frames to be transmitted;
    the counter of the received frame is greater than the counter of the preceding received frame and when the supplementary index has a value relative to the supplementary index of the preceding frame corresponding to a function that is the inverse of the monotonic function used to singularize the frames to be transmitted.

4. The method as claimed in claim 2, wherein, at an end of the detecting, when a retransmitted frame has not been detected, the counter of the received frame and, when the supplementary index differs from that of the frame previously received according to a monotonic function of the same order as that used to singularize the frames to be transmitted, the supplementary index are stored in the communication device implementing the method.

5. A non-transitory computer-readable medium comprising a program stored thereon, comprising program code instructions for executing a processing method when the program is executed by a processor of a communication device, wherein the instructions configure the communication device to:
　process frames received by the communication device from a connected object via a low-power wireless communication network, by:
　detecting retransmitted frames from among frames received by the communication device from the connected object identified in each frame received via the low-power wireless communication network by comparing a counter and a supplementary index of the received frame with, respectively, a counter and a supplementary index of a preceding received frame from the connected object, and
　transmitting for analysis the received frames for which a retransmission has not been detected.

6. A communication device comprising:
a processor; and
a non-transitory computer-readable medium comprising a program stored thereon comprising program code instructions for executing a processing method when the program is executed by a processor of a communication device, wherein the instructions configure the communication device to:
process frames received by the communication device from a connected object via a low-power wireless communication network, by:
detecting retransmitted frames from among frames received by the communication device from the connected object identified in each frame received via the low-power wireless communication network by comparing a counter and a supplementary index of the received frame with, respectively, a counter and a supplementary index of a preceding received frame from the connected object, and
transmitting for analysis the received frames for which a retransmission has not been detected.

* * * * *